(12) United States Patent
Ams

(10) Patent No.: US 12,271,909 B2
(45) Date of Patent: Apr. 8, 2025

(54) SYSTEM HAVING AT LEAST ONE PLANT SYSTEM HAVING AT LEAST A PLURALITY OF AGENTS

(71) Applicant: Sick AG, Waldkirch (DE)

(72) Inventor: Mathias Ams, Waldkirch (DE)

(73) Assignee: SICK AG, Waldkirch (DE)

( * ) Notice: Subject to any disclaimer, the term of this patent is extended or adjusted under 35 U.S.C. 154(b) by 461 days.

(21) Appl. No.: 17/697,341

(22) Filed: Mar. 17, 2022

(65) Prior Publication Data

US 2022/0300875 A1   Sep. 22, 2022

(30) Foreign Application Priority Data

Mar. 18, 2021 (DE) .......................... 102021106584.4

(51) Int. Cl.
*B25J 9/16* (2006.01)
*G05B 19/406* (2006.01)
*G06Q 30/018* (2023.01)

(52) U.S. Cl.
CPC .......... *G06Q 30/018* (2013.01); *B25J 9/1674* (2013.01); *G05B 19/406* (2013.01)

(58) Field of Classification Search
None
See application file for complete search history.

(56) References Cited

U.S. PATENT DOCUMENTS

| 8,014,898 B2* | 9/2011 | Nishi | G05B 19/41825 |
| | | | 82/149 |
| 8,213,318 B2* | 7/2012 | Ooba | G05B 19/0428 |
| | | | 370/242 |
| 9,689,696 B1* | 6/2017 | Russell | G05D 1/0287 |
| 9,792,746 B2* | 10/2017 | Brunner | G07C 9/21 |

(Continued)

FOREIGN PATENT DOCUMENTS

| DE | 102015108359 A1 | 12/2016 |
| DE | 102016102282 A1 | 8/2017 |

(Continued)

OTHER PUBLICATIONS

Motsch, William, et al. "Safety-Anforderungen an die digitale Maschinenrepräsentanz 2020" Whitepaper SF-3.3: Sep. 2020.

(Continued)

*Primary Examiner* — Jonathan M Dager
(74) *Attorney, Agent, or Firm* — Nath, Goldberg & Meyer; Jerald L. Meyer; Stanley N. Protigal

(57) ABSTRACT

The present invention teaches a system having at least one plant system having at least a plurality of agents, having at least a plurality of autonomous mobile robots, movable machinery, and a plurality of sensors for generating data for use for the safety relevant securing of the plant system, wherein a local plant safety system associated with the plant system is present, wherein data of the local plant safety system are stored in a first database, wherein the local plant safety system has a first data model having datasets of the plant system, wherein a decentral public plant library system (Continued)

associated with the local plant safety system is present, wherein the plant safety system and the plant library system are connected to one another via an interface, and wherein data and datasets can be transmitted between the plant safety system and the plant library system via the interface.

14 Claims, 8 Drawing Sheets

(56) References Cited

U.S. PATENT DOCUMENTS

| | | | | |
|---|---|---|---|---|
| 10,114,345 | B2* | 10/2018 | Saumer | G05B 9/02 |
| 10,394,576 | B2* | 8/2019 | Saumer | H01R 9/2625 |
| 10,416,659 | B2* | 9/2019 | Ota | G05B 19/0425 |
| 10,460,268 | B2* | 10/2019 | Tanaka | G05B 23/0267 |
| 10,726,538 | B2* | 7/2020 | Braune | G06V 20/52 |
| 10,809,161 | B2* | 10/2020 | Matsuo | G06Q 30/016 |
| 2001/0013832 | A1* | 8/2001 | Chavand | G05B 23/0272 |
| | | | | 340/506 |
| 2003/0004656 | A1* | 1/2003 | Bjornson | G05B 23/0278 |
| | | | | 702/34 |
| 2005/0278062 | A1* | 12/2005 | Janert | G06Q 10/08 |
| | | | | 700/214 |
| 2007/0101178 | A1* | 5/2007 | Jammu | G05B 23/0278 |
| | | | | 714/4.4 |
| 2008/0255682 | A1* | 10/2008 | Zhao | G05B 23/0289 |
| | | | | 700/30 |
| 2009/0077055 | A1* | 3/2009 | Dillon | G05B 23/0272 |
| | | | | 707/999.005 |
| 2011/0022641 | A1* | 1/2011 | Werth | H04L 67/125 |
| | | | | 707/E17.044 |
| 2011/0029102 | A1* | 2/2011 | Campney | G05B 15/02 |
| | | | | 700/83 |
| 2012/0019350 | A1* | 1/2012 | Klingelhofer | F16P 3/144 |
| | | | | 340/3.1 |
| 2013/0332383 | A1* | 12/2013 | Anzai | G05B 23/0275 |
| | | | | 705/325 |
| 2016/0008976 | A1* | 1/2016 | Nagatsuka | B25J 9/163 |
| | | | | 700/253 |
| 2016/0246294 | A1* | 8/2016 | Girardey | G05B 19/41845 |
| 2017/0003661 | A1* | 1/2017 | Lane | G05B 9/02 |
| 2017/0038762 | A1* | 2/2017 | Canedo | B25J 9/1674 |
| 2017/0080567 | A1* | 3/2017 | Quinquis | G05D 1/028 |
| 2017/0095926 | A1* | 4/2017 | Saboo | G05D 1/0217 |
| 2018/0210429 | A1* | 7/2018 | Jundt | G05B 23/02 |
| 2019/0043251 | A1* | 2/2019 | Winkle | G08G 5/006 |
| 2020/0259896 | A1* | 8/2020 | Sachs | H04W 4/30 |
| 2021/0232989 | A1* | 7/2021 | Rana | G05B 19/418 |
| 2021/0302956 | A1* | 9/2021 | Sudhakaran | G05D 1/0027 |
| 2022/0100184 | A1* | 3/2022 | Natarajan | G06N 3/008 |
| 2022/0118621 | A1* | 4/2022 | Paulitsch | B25J 13/089 |
| 2022/0137589 | A1* | 5/2022 | Höfig | G05B 19/41845 |
| | | | | 700/79 |
| 2022/0156614 | A1* | 5/2022 | Dalli | G06N 5/048 |
| 2022/0187806 | A1* | 6/2022 | Hammes | G01S 5/14 |
| 2022/0258327 | A1* | 8/2022 | Bangalore Srinivas | |
| | | | | B65G 1/1378 |
| 2024/0111585 | A1* | 4/2024 | Melchior | G06F 9/5027 |
| 2024/0181645 | A1* | 6/2024 | Christman | B25J 9/1689 |
| 2024/0182282 | A1* | 6/2024 | Adak | B66F 9/07581 |
| 2024/0184540 | A1* | 6/2024 | DiFurio | G06F 8/34 |

FOREIGN PATENT DOCUMENTS

| | | |
|---|---|---|
| EP | 2359201 A1 | 8/2011 |
| WO | WO-2024079318 A1 * | 4/2024 ............ B25J 9/1674 |

OTHER PUBLICATIONS

Bedenbender, Dr. Heinz, et al. "Verwaltungsschale in der Praxis Wie definiere ich Teilmodelle, beispielhafte Teilmodelle und Interaktion zwischen Verwaltungsschalen", Version 1.0, Jul. 2020.

* cited by examiner

SYSTEM HAVING AT LEAST ONE PLANT SYSTEM HAVING AT LEAST A PLURALITY OF AGENTS

FIELD

The present invention relates to a system having at least one plant system having at least a plurality of agents, having at least a plurality of autonomous mobile robots, movable machinery, and a plurality of sensors for the generation of data for use for a safety relevant securing of the plant system, wherein a local plant safety system associated with the plant system is present.

BACKGROUND

A Situation Description on the Introduction of Industry 4.0 and on the Revolution in Production and Logistics:

In today's world of factory and logistical automation, an ever higher degree of automated and flexible transport of machinery, material, goods, and parts is aimed for. It is implemented by AGVs (automated guided vehicles), ACGs (automated guided carts), and autonomous mobile robots (AMRs). They will be called autonomous mobile robots in the following. Agents are, for example, further machinery or machine parts, also mobile, for example, that represent further elements of such automation concepts or plant systems.

The manufacture of small runs, in particular a batch size of one, is specifically aimed for in the area of factory automation as part of Industry 40, which requires a flexible production concept. It is necessary to be able to implement such a flexible production concept to be able to be able to convert the production site, also called the shop floor, that is the organization in a factory workshop and the intralogistical transport routes, within a very short time.

In this connection, autonomous mobile robots take over the following tasks:
Automated conversion and restructuring of production
Dynamic material stores
Autonomous setting up of an intralogistical chain An automated conversion and restructuring of production takes place. Production can be restructured in dependence on the incoming jobs and their prioritization via an enterprise resource planning system (ERP) and via a manufacturing execution system (MES). Different production recipes, i.e. line planning and machine setups, are stored in the production system.

A system that plans the structure of the production lines and provides the autonomous mobile robots with jobs will in the future act between a manufacturing execution system (MES) and a supervisory control and data acquisition system (SCADA) in an automation pyramid in the future. This system also takes over the route coordination of the autonomous mobile robots for the material flow in later production operation. This system is called a plant layout and agent coordination system (PLACS) in the following.

The plant layout and agent coordination system (PLACS) transmits jobs on how a line structure is to be set up to the individual autonomous mobile robots and further agents. These jobs can, for example, include the following data:
the position at which a line element (e.g. a machine, an agent) is to be picked;
the position at which the line element is to be unloaded;
information on the load (weight, quantity, dimensions, etc.);
maximum values for speed and acceleration; and
identification features of the line element.

In communication with the agents, the plant layout and agent coordination system then defines the drive profiles of the agents or of the autonomous mobile robots.

Dynamic Material Stores:

Depending on the production job and on the structure of the production line, differently large capacities for the buffering of material, semifinished products, etc. have to be prepared at different production segments. The plant layout and agent coordination system prepares them dynamically, i.e. these storage sites are not rigid and they can vary in position and size.

Autonomous Setting Up of the Intralogistical Chain:

Once the production line has been restructured, delivery jobs are transmitted to the autonomous mobile robots by the plant layout and agent coordination system. The autonomous mobile robots are in constant communication with the plant layout and agent coordination system and other autonomous mobile robots via a communication network. Obstacles, "bottlenecks", etc. are thus known to every autonomous mobile robot. In this interaction, the autonomous mobile robots are able to calculate and carry out the shortest and best optimized routes.

These jobs can, for example, include the following data:
the position at which the material is to be picked;
the position at which the line element is to be unloaded;
information on the load (weight, quantity, dimensions, etc.);
maximum values for speed and acceleration; and
identification features of the load.

The above-described way of operating a modern Industry 4.0 enabled production can also be transmitted in a similar manner to parts of store logistics and logistic centers.

Modern production and logistic centers are already able to at least partially implement such concepts today. Such concepts will continue to advance in industry due to Industry 4.0 and the internet of things (IoT) approach, the setting up and expansion of modern communication technologies (e.g. 5G), expansion of storage and server technologies, and the increasing use of artificial intelligence (AI).

Problems from the Perspective of Functional Safety Engineering

Functional safety engineering is based on the principle of being able to assess the risk associated with every hazard that can generally occur due to a plant, machine, or the "industrial" environment and of then being able to implement suitable countermeasures. Since both the operators and the manufacturers of such plant take over liability for a safe operation, a natural person is finally always responsible for the evaluation of the risk and the effectivity of the implemented measures.

However, this contradicts the demands and concepts of Industry 4.0 since a complete, new risk assessment of the plant, or at least of parts that have been changed, would be necessary after every change the plant layout and agent coordination systems makes on the plant. Functional safety engineering would thus prevent this progress.

Machine Centered Approach:

Classical functional safety is achieved in such plant in that the hazards are identified in a machine centered manner, the risk of injury is analyzed, and then risk-reducing measures are implemented. An autonomous mobile robot is used in this approach such that collision avoidance is implemented with the aid of a safety laser scanner, for example. The scanner recognizes objects on the basis of speed dependent protected fields; as a response, the speed is reduced down to a standstill before a collision takes place. However, this reaches its limits where the object is an interaction site (e.g. material transfer, battery charging station, bottleneck, etc.) or similar which the autonomous mobile robot has to approach. It is then necessary there to know the position of the interaction site and to switch over from the primary safety function of collision avoidance into an adequate secondary safety function (for example, reducing the speed and force).

The recognition of the position can take place assisted by localization technologies (UWB radio, radio, wireless LAN, odometry, local features, etc.).

Since the position is, however, not fixed in a constantly changing environment and new potential hazard sites can constantly result, the current machine centered approach is not suitable to enable Industry 4.0 concepts.

The machine centered approach cannot deal with changes to the layout of the plant in an automated manner. At least the part of the change has to be reassessed and validated on every change. This can also have the consequence of huge influences on the implementation of functional safety engineering. This approach is not suitable for flexible concepts.

Plant Centered Approach with Object Localization:

The plant centered approach contrasts with the machine centered approach. It is assumed here that all the stationary hazard sites are known and the position of all the movable objects (AMRs, agents, and humans) are likewise known under real time conditions. It is furthermore assumed that a risk index can be associated with every object based on the knowledge of the automation work and the current trajectory.

An appropriate risk reducing response is then initiated even before the occurrence of a hazard in dependence on the trajectory and the risk index. It can, for example, be alternative routes, a reduction of the speed, etc.

The plant centered approach with object localization can deal with flexible plant concepts better, but has weak spots in the determination of the risk index of agents and in the flexible restructuring of the plant by agents and autonomous mobile robots.

It is decisive on the assessment of the risk index of agents and autonomous mobile robots to have knowledge of the physical properties of the autonomous mobile robots (mass, surface, dimensions, etc.) and their loads. A risk index can only be reliably determined with knowledge of these properties.

After the restructuring of the plant, completely new hazard sites can arise that had not existed in this form before. Examples for this are new bottlenecks that are produced in that machines are closer together as part of the newly created structure. Or the material is buffered at new sites and new hazards are hereby produced. The assessments of these new hazards are not sufficiently considered in the plant centered approach with object localization.

Overall, the purely object localization neglects the required mechanisms of risk assessment, measure planning, and validation of the effectivity of the measures since they are not considered on the observation of the object properties.

SUMMARY

It is an object of the invention to provide an improved system for the safety of a plant system.

The object is achieved by a system
having at least one plant system having at least a plurality of agents, having at least a plurality of autonomous mobile robots, movable machinery, and a plurality of sensors for generating data for use in the safety relevant securing of the plant system,
wherein a local plant safety system associated with the plant system is present;
wherein data of the local plant safety system are stored in a first database;
wherein the local plant safety system has a first data model with data sets of the plant system;
wherein a decentral public plant library system associated with the local plant safety system is present;
wherein the plant library system is stored in a second database;
wherein the plant library system has at least one second data model having at least data sets for the plant safety system; and
wherein
the plant safety system and the plant library system are connected to one another via an interface, with data and data sets being transferable between the plant safety system and the plant library system via the interface.

The invention allows a global safe map of the plant system to be produced in the plant safety system. The system combines the machine centered concept with the plant centered concept for this purpose. It furthermore defines mechanisms for the automated risk assessment and measure planning, implementation, and validation of dynamic functional safety engineering in an automated flexible plant.

The solution space for dynamic functional safety engineering is constantly expanded, for example by the use of edge cloud computing, sensor data merging, artificial intelligence, and services.

The following goals are achieved with the aid of the invention:
appropriate safety in a plant system:
maximization of productivity;
self learning functional safety engineering.

In accordance with the invention, there is a public plant library system (that is also called a safety cloud ECO system, SCES). The operator of this application, that is of the plant library system, is a company or a group of users that ensure(s) that there are also matching functions and measures for risk reduction for determined hazards. The plant library system has a library of hazards, methods, functions, algorithms, measures, and risk indices in the second database for this purpose.

Supported by expert knowledge, associated risk assessments and measures and functions are also always stored on the stored hazards in the plant library system. Based on this expert knowledge, the method of finding a solution, from the hazard via the determined risk up to the measure and the required algorithm for risk reduction are also stored for every hazard in the second database.

There is the local plant safety system (also called a plant safety control cloud, (PSCC) at the plant level; it represents all the hazards occurring in the plant with the associated measures and safety functions in a first database.

The plant library system has at least one second data model having at least data sets for the plant safety system. in this respect, the plant library system does not have a map of the plant safety system but rather a collection of scenarios that can suit the plant safety system and that can be carried out on the plant safety system.

In a further development of the invention, the plant safety system has a link to a coordination system. The system thus comprises a coordination system. The plant safety system receives data of a planned layout change before an activation evaluates it in a simulation.

The plant safety system itself takes over the carrying out of safety functions. It has corresponding safety relevant architectures for this purpose, for example. Redundant and/or two-channel structures and/or diagnostic devices with respect to technologies, function execution, communication, and data management, for example.

Not all the sensors exclusively have the task of safety relevant securing, but they rather also deliver data in parallel with their automation work for this purpose.

In a further development of the invention, the datasets respectively have at least a geometry, a hazard, a safety level, a position, a speed, an identification, and a measure.

The operator of the plant library system constantly expands this library.

Expansion of the Plant Library System:

There are generally different options on how the library can be expanded:
contributions by user groups
contributions by the operator of the plant library system Contributions by User Groups:

The operator of the plant library system and the user groups of the plant library system organize the plant library system as an open community approach, for example, i.e. the user groups have their own know-how in functional safety engineering. They carry out their own risk analyses and define the methods of the risk reduction and make the results available in the plant library system. User groups can also use the plant library system to provide their solutions (datasets) to others through licenses.

Contributions by the Operator of the Plant Library System:

The operator of the plant library system offers the service of risk analysis, definition of risk reduction measures, and their development as digital services. A new dataset is generated on every new hazard and is then made available to the library as an element.

In a further development of the invention, the plant safety system is configured to carry out a risk assessment and a risk evaluation for the plant system cyclically or after determining a change and to make decisions on a necessity of a risk reduction cyclically or after determining a change, whereby the plant safety system is configured for an automatic and dynamic preparation of a risk evaluation of the plant system.

Detecting the Environment:

The basis for the measures on risk reduction is the availability of a digital twin of the plant system as an image in the plant safety system. The focus of the digital twin is on movement sequences, positions, and further characteristics that can result in hazards for humans in the plant system. On the one hand, all the required sensors are linked to the plant safety system for this purpose to be able to feed their data for the generation of the digital twin. The map of the plant system in the plant safety system has to be constantly updated so that the plant geometry can adapt the demands of the current production job.

In a further development of the invention, sensors are arranged at the autonomous mobile robots and at the agents and the sensors generate sensor data for the plant safety system.

Autonomous mobile robots, movable machinery or movable agents are for this purpose, for example, equipped with imaging, position determining sensors and identification sensors to keep the digital twin constantly updated on the satisfying of the automation work at the elapsed time. Different autonomous mobile robots, for example, thus deliver position data and corresponding imaging data to the plant safety system constantly or on demand of the plant safety system. These data can thus be cross-validated, which contributes to the error safety of the digital twin. These data can furthermore also be merged from different sources to optimize the spatial imaging.

To avoid systematic errors, the autonomous mobile robots can also be equipped with different sensor technologies.

It can also be necessary in some cases that drones can also be used as autonomous mobile robots in addition to the autonomous mobile robots that are required for the automation work. This can be the case when imaging data from different perspectives are required that the autonomous mobile robots cannot deliver in an optimum manner. The use of autonomous drone robots can furthermore be sensible when the autonomous mobile robots for the automation work are to work with a minimal sensor setup for cost reasons. The autonomous drone robots can have degrees of freedom of movement in the X, Y, and Z directions depending on the demand.

Detecting the environment and determining the position can take place using the sensor technologies UWB radio localization and LIDAR or LIDAR localization. The UWB radio localization uses UWB radio stations and UWB tags or UWB transponders for this purpose, for example. These two technologies are, however, only exemplary for different options.

In a further development of the invention, the plant safety system has a digital map.

A UWB localization, for example, determines the position of the different agents and autonomous mobile robots or vehicles by means of time of flight measurement and triangulation. LIDAR is also used, for example, to prepare the map using the contour data.

The map is initially prepared by an autonomous mobile robot and is stored as a central map in the plant safety system. This central map is expanded by the data from the UWB localization and optionally wireless LAN data. A digital twin of the plant system has thus been created in the plant safety system.

All the further autonomous mobile robots download this central map from the plant safety system and thus localize themselves.

Determining the Position:

Knowledge of the position is important in this approach. The position can be determined from different sources. The map of the plant system is located in the digital twin that is carried out in the plant safety system. This map is constantly updated by the position data and the imaging data of the agents and autonomous mobile robots.

The map in the plant safety system and the data from the position determining and imaging data are used on the autonomous mobile robots to determine the position of every autonomous mobile robot. The map on the plant safety system can also be stored as a local copy on the autonomous mobile robots.

A position determination of all the agents and autonomous mobile robots takes place in a further development of the invention.

Detecting Changes in the Map of the Digital Twin and Measures:

The autonomous mobile robots continuously deliver data to the plant safety system to update the map and in return also have continuous access to an updated map.

Each autonomous mobile robot furthermore receives identification codes on the further movable objects (e.g. autonomously mobile vehicles, autonomous mobile robots, movable machinery, agents) located in the environment from the plant safety system. This information, for example, contains further information such as the classification of the object and the exact position, movement information, etc.

As soon as an autonomous mobile robot determines a change with respect to the map and cannot exclude a hazard for persons via the identification code present, a risk reduction procedure is initiated.

As part of the risk reduction procedure, a response is made locally on the autonomous mobile robot by collision avoidance in a first step. In a second step, the autonomous mobile robots that are in the environment of the changes of the real situation in comparison with the digital twin are informed of the change via the plant safety system. In a third step, a check is made on the plant safety system whether the changed situation is an already classified risk; see "Risk reduction for which a risk classification is already present in the plant safety system".

If the risk has already been classified, the corresponding datasets on the autonomous mobile robots are updated, i.e. the measures implemented in software also undergo an update.

If no classified risk and thus dataset is present on the plant safety system for the new situation, a matching risk and dataset can be looked for in the public library plane on the plant library system.

If there is also no correspondingly classified dataset in the public library level on the plant library system, a risk analysis and where necessary the planning and implementation of measures have to be carried out by experts. As part of this activity, a new classified dataset is then produced that can be taken over in the plant safety system and/or in the plant library system on the library level.

Experts can in this connection be trained specialists for functional safety or also expert systems supported by automated Artificial Intelligence.

Collision Avoidance:

Collision avoidance is the primary protective function that is carried out locally on the autonomous mobile robots as soon as an object is located in the direction of travel of the autonomous mobile robot and it cannot be excluded that it is a person. Both data from sensors on the autonomous mobile robot and data from the plant safety system can be used for detecting objects.

Risk Reduction for which a Risk Classification is Already Present in the Plant Safety System:

A map of the situation is prepared locally on the autonomous mobile robot using the available data, for example primarily using the imaging data. The data are transmitted to the plant safety system. Further data can be used there to particularize the image of the situation. These further data can originate from stationary imaging sensors, imaging sensors of other autonomous mobile robots in the proximity, etc. A search is made in the database of the plant safety system with reference to the situation as to whether this situation is already a known scenario. If a risk classification is already present for the situation, the corresponding measures are then carried out on the autonomous mobile robot.

Risk Analysis:

A comparison of the situation with already classified datasets takes place on the plant safety system. If an agreement is found, this dataset is taken over for the measures and the implementation.

Risk Reduction for Unclassified Risks by Experts/Persons:

The risk reduction of new, not classified risks is carried out by experts/persons in accordance with the current normative regulations (for example ISO 12100, ISO 13849, etc.). The following process steps are generally observed:

Risk analysis
Designing the measures
Implementing the measures
Verifying and validating the measures
Generating a classified dataset This procedure requires that all the required steps take place in accordance with uniform and software assisted rules and standards. This means that the plant library system also offers the corresponding development tools for risk analysis, software development, simulation, verification, validation, etc. Tools of third parties can be used in part in the implementation of corresponding interfaces and services in the individual steps:

Risk Analysis:

A situation is analyzed here with respect to the risk of injury to a human. The analysis is made using different features such as the geometry, structure, movement profiles, interaction with other agents, occurrence likelihood, frequency and duration of the exposition, degree of the possible injury, etc.

Measure Design:

Technical and organizational measures are defined with whose aid the risk of injury to humans can be sufficiently reduced. Since it is the aim to use existing hardware wherever possible and to implement the measures in software as far as possible, this is specified as a guideline in the definition of the measures.

Which parameters can be configured specifically to the application and according to which regulations the configuration then takes place is also defined as part of the measure design.

The internal and external interfaces of the measure of the system are furthermore also defined in this phase.

To which target systems, that is hardware platforms, the measure should be applied is furthermore also fixed in this phase.

Implementation:

Algorithms are developed, documented, and implemented in accordance with the current standards as part of the implementation.

A plurality of implementations can also take place for different hardware and operating system platforms.

Verification and Validation:

The implemented measures are checked with respect to their effectivity by means of simulation and test as part of the verification and validation. The measures are tagged as verified on a positive result.

Generating a Classified Dataset:

Once all the aforesaid steps have been run through, a situation that has produced a new situation has been completely described and the measures for risk reduction have been developed, documented, and validated. The data generated here are stored as a dataset and can then be made available both in the plant safety system and also in the plant library system on the public library level.

The use of the tools is furthermore likewise stored as a dataset for the methodology to thus continuously improve the availability.

In a further development of the invention, differences between the digital map and the recognized real environmental situation are recognized by the plant safety system.

In a further development of the invention, the plant library system is configured to read applicable standards and/or regulations and the plant library system is configured to carry out the automatic and dynamic preparation of the risk evaluation on the basis of the applicable standards and/or regulations.

Risk Reduction for Unclassified Risks by Automated Expert Systems in the Plant Library System:

The risk reduction of new, not classified risks is carried out by an automated expert system in accordance with the current normative regulations (for example ISO 12100, ISO 13849, etc.). The following process steps are generally observed:

Risk analysis
Design of the measures
Implementing the measures
Verifying and validating the measures
Generating a classified dataset This procedure requires that all the required steps take place in accordance with uniform and software assisted rules and standards. This means that the methods of the risk reduction that human experts use are formed as an algorithm in the automated expert system such that the expert system can use the same performance and methodology as human experts.

The automated expert system can furthermore make use of technological approaches from an artificial intelligence. The proof of risk reduction is then not only based on the data and scenarios present in the plant safety system, but also on yielding expanded external data.

Risk Analysis:

A situation is analyzed here with respect to the risk of injury to a human. The analysis is made using different features such as the geometry, structure, movement profiles, interaction with other agents, occurrence likelihood, frequency and duration of the exposition, degree of the possible injury, etc.

The use of the automated expert system can already be assisted by the use of simulation in this phase. I.e. the plant library system has a complete digital twin of the plant system and simulates all the possible predictable scenarios at the newly created risk position. The hazard risk at this site then results from the simulation.

Measure Design, Implementation, Verification and Validation:

The process steps of measure design up to the validation are iterative steps that are based very much on simulation and training of algorithms. These steps are run through by the automated expert system for so long until the simulation on the plant library system has as a result the result of a sufficiently great risk reduction. The dataset is then made available on the plant library system, but not tagged as validated.

The implementation for different target systems can already be part of the provided dataset, but is not yet operable without a validation by a person.

Generating a Classified Dataset:

Once all the required aforesaid steps have been run through, a new situation that has produced a new risk has been completely described once for exactly this specific target application and the measures for risk reduction have been developed, and validated.

So that this dataset can be taken up as classified in the plant library system and plant safety system, it has to be qualified by field testing and multiple validation of an expert group.

The data generated here are stored as a dataset and can then be made available both in the plant safety system and also in the plant library system on the public library level.

In a further development of the invention, the plant safety system is configured to detect and to check risk reduction measures cyclically or after a determination of a change and is configured to adapt the risk reduction measures cyclically or after determining a change.

Safety Mechanisms in the Detection of the Environment:

The environment is detected from different perspectives and different sensor technologies.

Different Perspectives are:
Sensors at different autonomous mobile robots, movable and stationary machinery, and additionally also sensors or information from infrastructure components.

Different Sensor Technologies:
Position detection
Identification sensors
Imaging sensors (camera, LIDAR, radar, etc.)
Radio triangulation.
Further sensor technologies that are not listed can be used.

Safety Mechanisms in the Preparation of the Digital Twin:

Different autonomous mobile robots and agents having different hardware platforms and navigation software use the central map. The central map is thus constantly checked.

Safety Mechanisms in the Data Management of the Datasets:

The datasets in the plant safety system and in the plant library system are stored on different respectively redundant parts of the plant library system. Known securing methods of IT and OT are used.

Safety Mechanisms in the Communication Between the System Participants:

Communication generally has to satisfy safety demands in accordance with the objects of the communication. The safety mechanisms can here extend from simple CRCs such as in the securing level of TCP, over safe communication protocols, up to the use of blockchain technologies.

This approach enables the implementation of dynamic automated plant planning and thus the implementation of Industry 4.0 demands.

The agents and thus parts in the plant itself take over tasks of safety engineering.

Assessed risks and the associated measures are stored in the central plant library system and can thus be scaled and multiplied globally to a high degree.

In a further development of the invention, the plant safety system and the plant library system are set up as expert systems that are configured to continuously expand the database for new hazards and are configured to generate new datasets.

BRIEF DESCRIPTION OF THE DRAWINGS

The invention will also be explained in the following with respect to further advantages and features with reference to the enclosed drawing and to embodiments. The Figures of the drawing show in.

DETAILED DESCRIPTION

Figure 1:
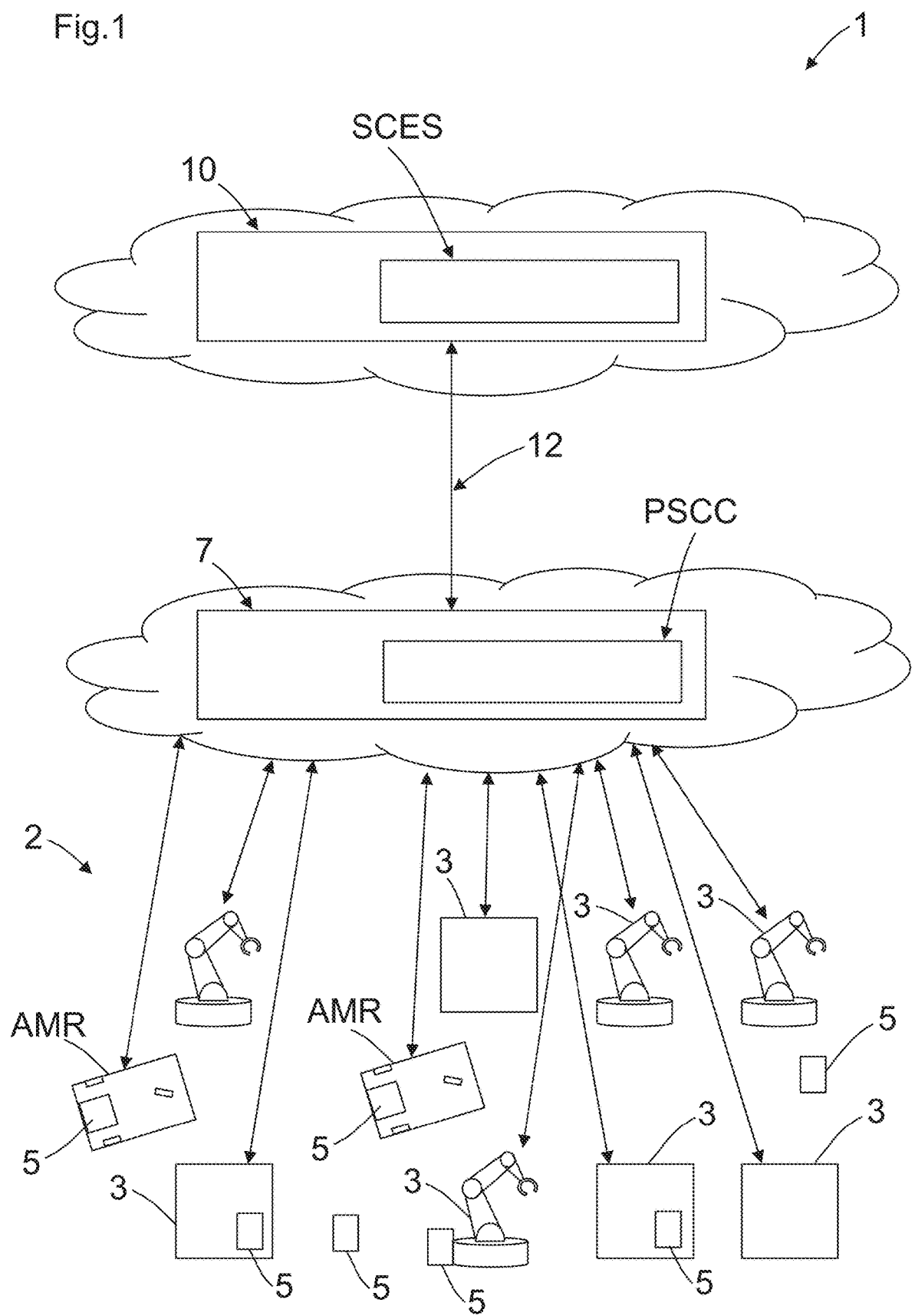
FIG. 1 a system with of at least plant system.

In the following Figures, identical parts are provided with identical reference numerals.

FIG. 1 shows a system 1 having at least one plant system 2 having at least a plurality of agents 3, having at least a plurality of autonomous mobile robots AMR, movable machinery, and a plurality of sensors 5 for generating data for use for the safety relevant securing of the plant system 2, wherein a local plant safety system PSCC associated with the plant system 2 is present, wherein data of the local plant safety system PSCC are stored in a first database 7, wherein the local plant safety system PSCC has a first data model having datasets of the plant system 2, wherein a decentral public plant library system SCES associated with the local plant safety system PSCC is present, wherein the plant library system SCES is stored in a second database 10, wherein the plant library system SCES has at least one second data model of at least datasets for the plant safety system (PSCC) 2, wherein the plant safety system PSCC and the plant library system SCES are connected to one another via an interface 12, and wherein data and datasets can be transmitted between the plant safety system PSCC and the plant library system SCES via the interface 12.

There is a public plant library system in accordance with FIG. 1. The operator of this application, that is of the plant library system SCES, is a company or a group of users that ensure(s) that there are also matching functions and measures for risk reduction for determined hazards. The plant library system SCES has a library of hazards, methods, functions, algorithms, measures, and risk indices in the second database 10 for this purpose.

Supported by expert knowledge, associated risk assessments and measures and functions are also always stored on the stored hazards in the plant library system SCES. Based on this expert knowledge, the method of finding a solution, from the hazard via the determined risk up to the measure and the required algorithm for risk reduction are also stored for every hazard in the second database 10.

The local plant safety system PSCC is present on the plant level. It represents all the hazards occurring in the plant with the associated measures and safety functions in a first database 7.

For example, the datasets respectively have at least a geometry, a hazard, a safety level, a position, a speed, an identification, and a measure.

For example, the plant safety system PSCC is configured to carry out a risk assessment and a risk evaluation for the plant system 2 cyclically or after determining a change and to make decisions on a necessity of a risk reduction cyclically or after determining a change, whereby the plant safety system PSCC is configured for an automatic and dynamic preparation of a risk evaluation of the plant system 2.

Detecting the Environment:

The basis for the measures on risk reduction is the availability of a digital twin of the plant system 2 as an image in the plant safety system PSCC. The focus of the digital twin is on movement sequences, positions, and further characteristics that can result in hazards for humans in the plant system 2. On the one hand, all the required sensors 5 are linked to the plant safety system PSCC for this purpose to be able to feed their data for the generation of the digital twin there. The map of the plant system 2 in the plant safety system PSCC has to be constantly updated so that the plant geometry can adapt the demands of the current production job.

Figure 2:
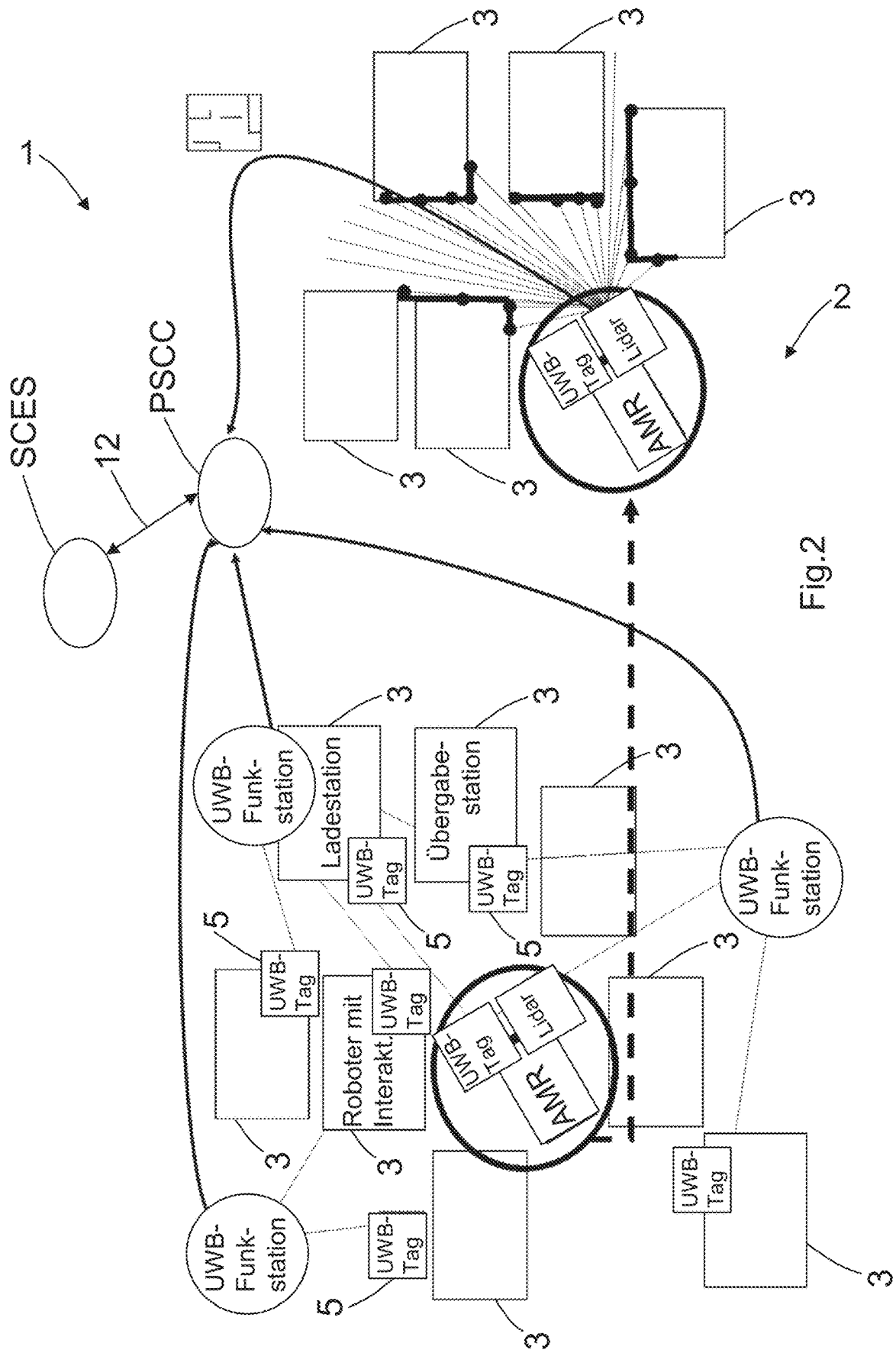
FIG. 2 to FIG. 4 respectively, a schematic representation of a plant system.

FIG. 2 shows a schematic representation of a plant system 2. In accordance with FIG. 2, sensors are arranged at the autonomous mobile robots AMR and at the agents 3 and the sensors 5 generate sensor data for the plant safety system PSCC.

Autonomous mobile robots AMR, movable machinery or movable agents 3 are for this purpose, for example, equipped with imaging, position determining sensors 5 and identification sensors to keep the digital twin constantly updated on the satisfying of the automation work at the elapsed time. Different autonomous mobile robots AMR, for example, thus deliver position data and corresponding imaging data to the plant safety system PSCC constantly or on demands of the plant safety system PSCC. These data can thus be cross-validated, which contributes to the error safety of the digital twin. These data can furthermore also be merged from different sources to optimize the spatial imaging.

To avoid systematic errors, the autonomous mobile robots AMR can also be equipped with different sensor technologies.

It can also be necessary in some cases that drones are also used as autonomous mobile robots AMR in addition to the autonomous mobile robots AMR that are required for the automation work. This can be the case when imaging data from different perspectives are required that the autonomous mobile robots AMR cannot deliver in an optimum manner. The use of autonomous drone robots can furthermore be sensible when the autonomous mobile robots AMR for the automation work are to work with a minimal sensor setup for cost reasons. The autonomous drone robots can have degrees of freedom of movement in the X, Y, and Z directions depending on the demand.

Detecting the environment and determining the position can take place using the sensor technologies UWB radio localization and LIDAR or LIDAR localization.

The UWB radio localization uses UWB radio stations and UWB tags or UWB transponders for this purpose, for example. These two technologies are, however, only exemplary for different options.

For example, the plant safety system has a digital map. A UWB localization, for example, determines the position of the different agents 3 and autonomous mobile robots AMR or vehicles by means of time of flight measurement and triangulation. LIDAR is also used, for example, to prepare the map with reference to the contour data.

The map is initially prepared by an autonomous mobile robot AMR and is stored as a central map in the plant safety system. This central map is expanded by the data from the UWB localization and optionally wireless LAN data. A digital twin of the plant system 2 has thus been created in the plant safety system PSCC.

All the further autonomous mobile robots AMR download this central map from the plant safety system PSCC and thus localize themselves.

Determining the Position:

Knowledge of the position is important in this approach. The position can be determined from different sources. The map of the plant system 2 is located in the digital twin that is carried out in the plant safety system PSCC. This map is constantly updated by the position data and the imaging data of the agents 3 and autonomous mobile robots AMR.

The map in the plant safety system PSCC and the data from the position determining and imaging data are used on the autonomous mobile robots AMR to determine the position of every autonomous mobile robot AMR. The map on the plant safety system PSCC can also be stored as a local copy on the autonomous mobile robots AMR.

A position determination of all the agents 3 and autonomous mobile robots AMR takes place. for example.

Detecting Changes in the Map of the Digital Twin and Measures:

The autonomous mobile robots AMR continuously deliver data to the plant safety system PSCC to update the map and in return also have continuous access to an updated map.

Figure 3:
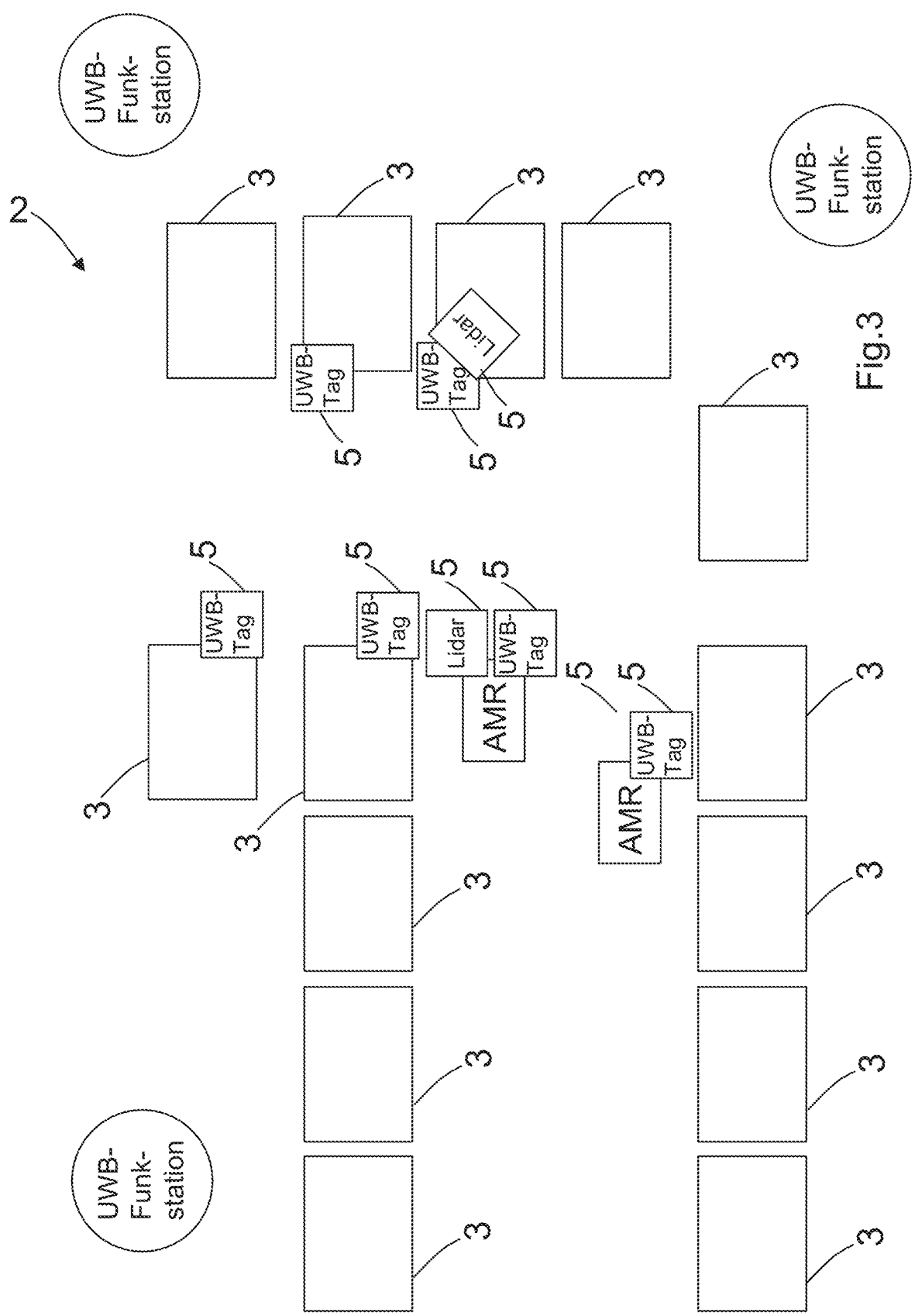
Figure 4:
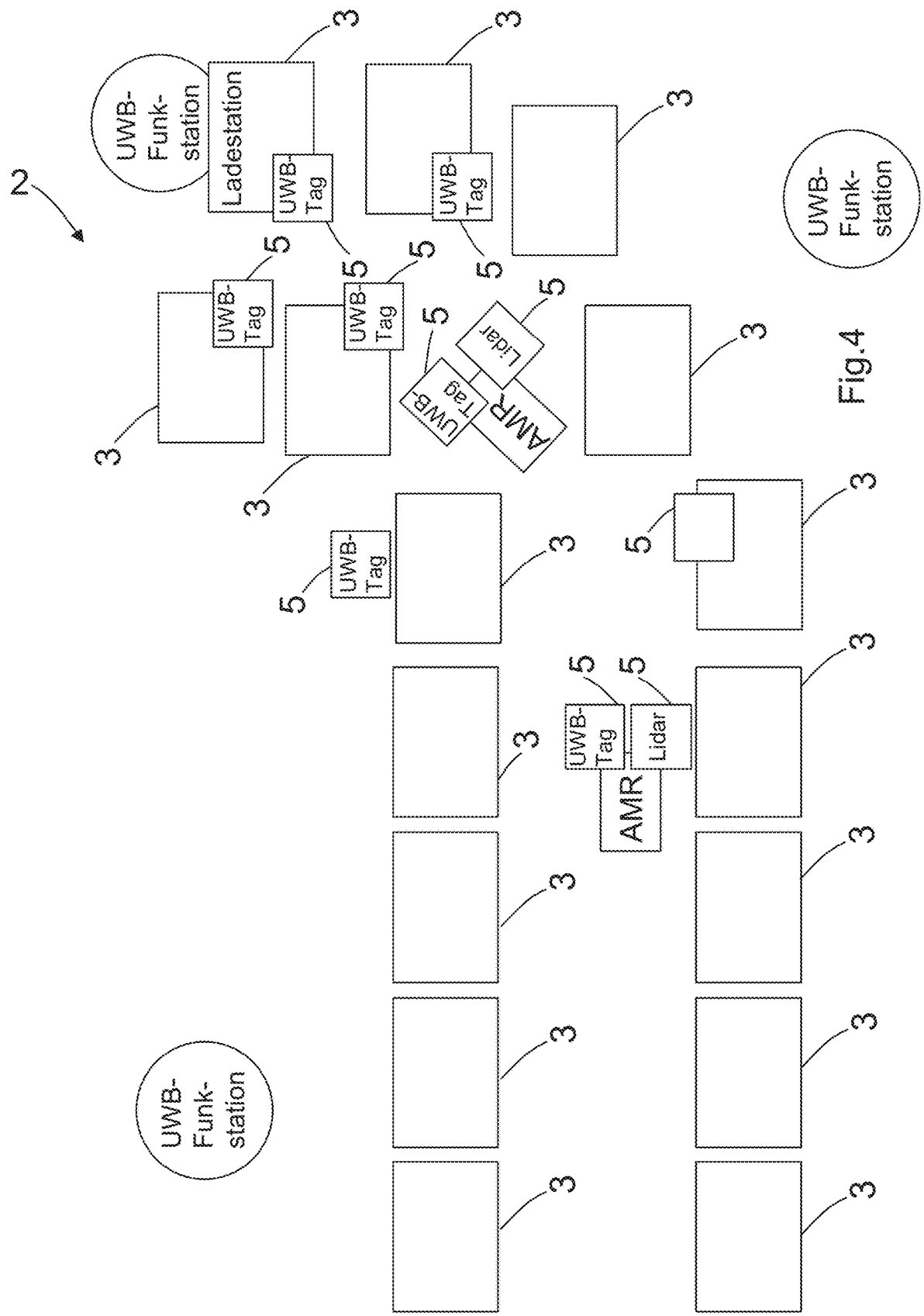

FIG. 2 shows a schematic representation of a plant system 2. FIG. 4 shows the plant system in accordance with FIG. 3 with changes made.

Each autonomous mobile robot AMR receives identification codes on the further movable objects (e.g. autonomously mobile vehicles, autonomous mobile robots AMR, movable machinery, agents 3) located in the environment from the plant safety system SCES. This information, for example, contains further information such as the classification of the object and the exact position, movement information, etc.

As soon as an autonomous mobile robot determines a change in accordance with FIG. 4 with respect to the map and cannot exclude a hazard for persons via the identification code present, a risk reduction procedure is initiated.

Figure 5:
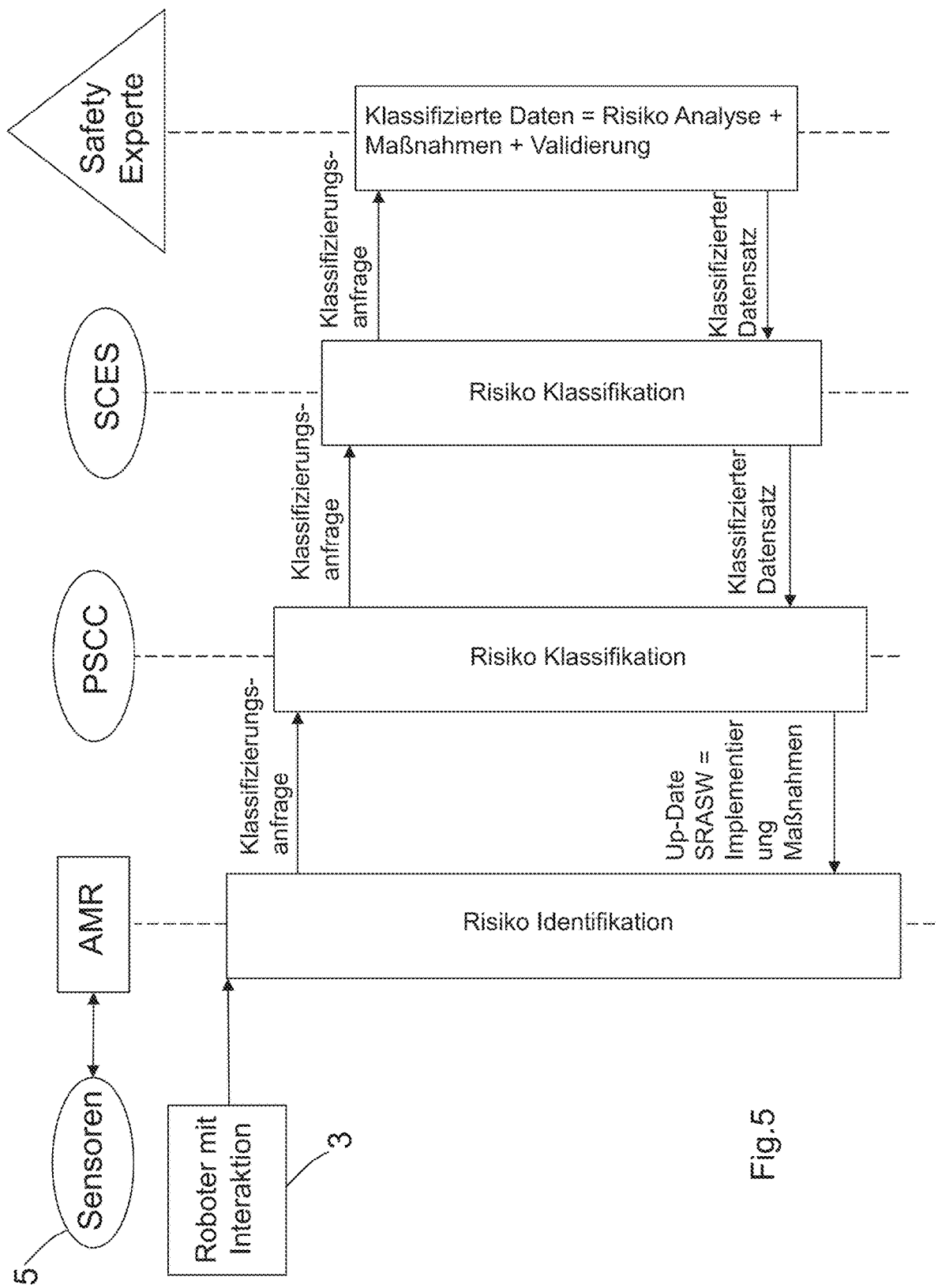
FIG. 5 a flowchart of a classification query.

FIG. 5 shows a flowchart of a classification query.

As part of the risk reduction procedure, a response is made locally on the autonomous mobile robot AMR by collision avoidance in a first step. In a second step, the autonomous mobile robots AMR that are in the environment of the changes of the real situation in comparison with the digital twin are informed of the change via the plant safety system PSCC. In a third step, a check is made on the plant safety system PSCC whether the changed situation is an already classified risk; see "Risk reduction for which a risk classification is already present in the plant safety system PSCC".

If the risk has already been classified, the corresponding datasets on the autonomous mobile robots AMR are updated, i.e. the measures implemented in software also undergo an update.

If no classified risk and thus dataset is present on the plant safety system PSCC for the new situation, a matching risk and dataset can be looked for SCES in the public library level on the plant library system SCES.

If there is also no correspondingly classified dataset at the public library level on the plant library system SCES, a risk analysis and where necessary the planning and implementation of measures have to be carried out by experts. As part of this activity, a new classified dataset is then produced that can be taken over in the plant safety system PSCC and/or in the plant library system SCES on the library level.

Experts can in this connection be trained specialists for functional safety or also expert systems supported by automated Artificial Intelligence.

Collision Avoidance:

Collision avoidance is the primary protective function that is carried out locally on the autonomous mobile robots AMR as soon as an object is located in the direction of travel of the autonomous mobile robot AMR and it cannot be excluded that it is a person. Both data from sensors 5 on the autonomous mobile robot AMR and data from the plant safety system PSCC can be used for detecting objects.

Risk Reduction for which a Risk Classification is Already Present in the Plant Safety System PSCC:

A map of the situation is prepared locally on the autonomous mobile robot AMR using the available data, for example primarily using the imaging data. The data are transmitted to the plant safety system PSCC. Further data can be used there to particularize the image of the situation. These further data can originate from stationary imaging sensors 5, imaging sensors 5 of other autonomous mobile robots AMR in the proximity, etc. A search is made in the database of the plant safety system PSCC with reference to the situation as to whether this situation is already a known scenario. If a risk classification is already present for the situation, the corresponding measures are then carried out on the autonomous mobile robot AMR.

Figure 6:
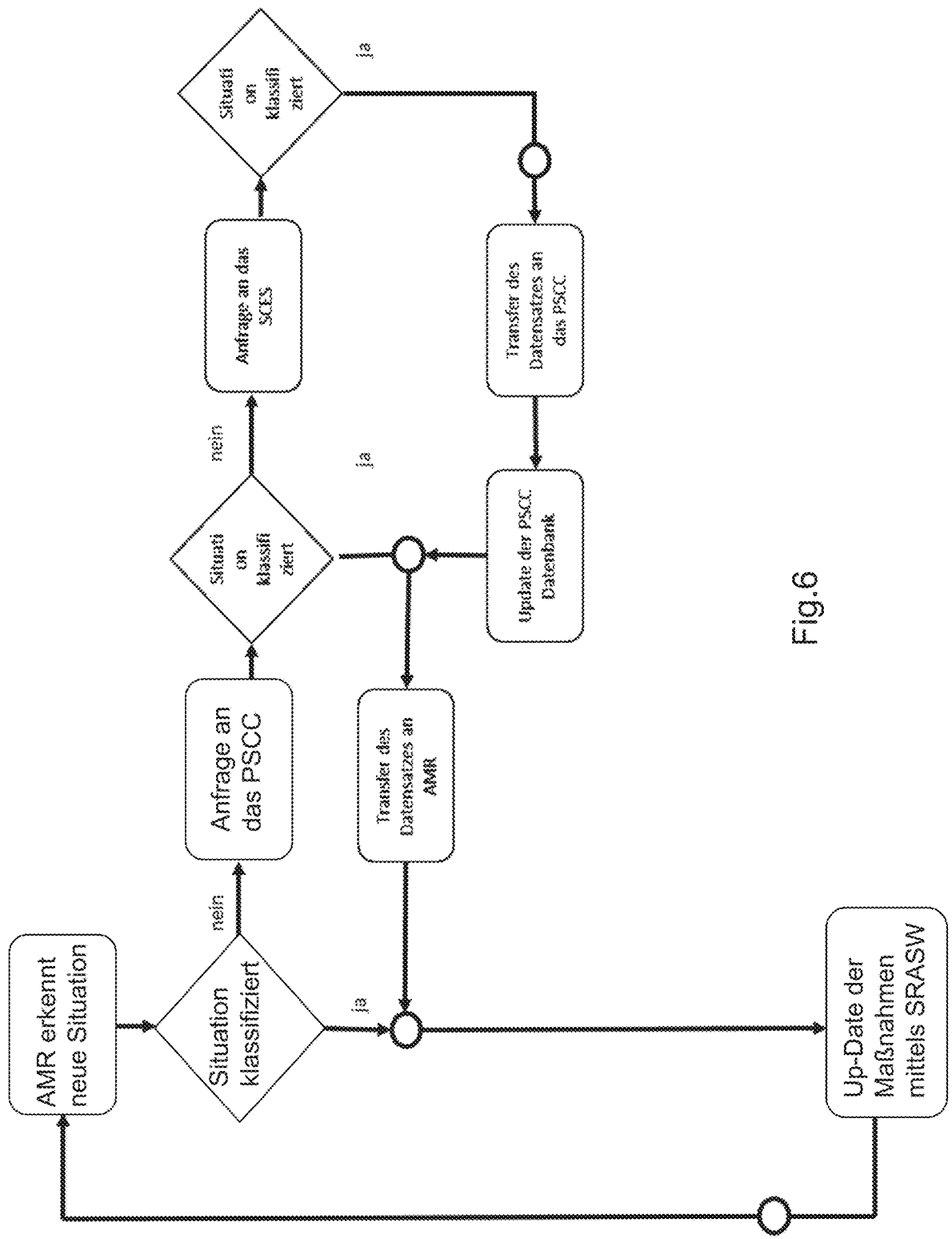
FIG. 6 a schematic sequence plan with already classified risks.

FIG. 6 shows a schematic sequence plan with already classified risks.

In accordance with a risk analysis, a comparison of the situation with already classified datasets takes place on the plant safety system PSCC. If an agreement is found, this dataset is taken over for the measures and the implementation.

Figure 7:
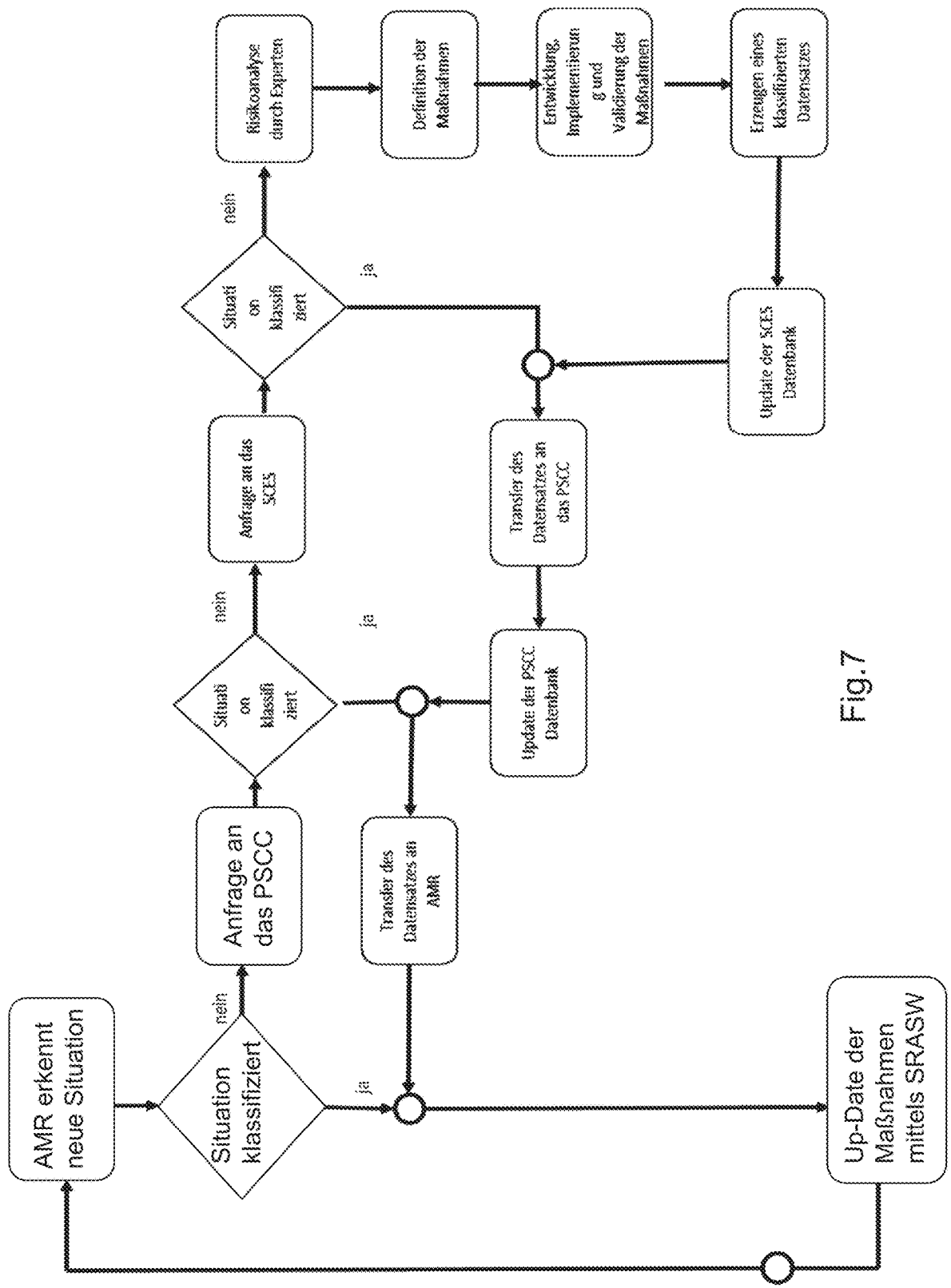
FIG. 7 shows a schematic sequence plan with unclassified risks and an assessment by an expert.

FIG. 7 shows a schematic sequence plan with unclassified risks and an assessment by an expert.

The risk reduction of new, not classified risks is carried out by experts/persons in accordance with the current normative regulations (for example ISO 12100, ISO 13849, etc.). The following process steps are generally observed:

Risk analysis
Design of the measures
Implementing the measures
Verifying and validating the measures
Generating a classified dataset This procedure requires that all the required steps take place in accordance with uniform and software assisted rules and standards. This means that the plant library system SCES also offers the corresponding development tools for risk analysis, software development, simulation, verification, validation, etc. Tools of third parties can be used in part in the implementation of corresponding interfaces and services in the individual steps:

Risk Analysis:

A situation is analyzed here with respect to the risk of injury to a human. The analysis is made, for example, using different features such as the geometry, structure, movement profiles, interaction with other agents, occurrence likelihood, frequency and duration of the exposition, degree of the possible injury, etc.

Measure Design:

Technical and organizational measures are defined with whose aid the risk of injury to humans can be sufficiently reduced. Since it is the aim to use existing hardware wherever possible and to implement the measures in software as far as possible, this is specified as a guideline in the definition of the measures.

Which parameters can be configured specifically to the application and according to which regulations the configuration then takes place is also defined as part of the measure design.

Verification and Validation:

The implemented measures are checked with respect to their effectivity by means of simulation and test as part of the verification and validation. The measures are marked as verified on a positive result.

Generating a Classified Dataset:

Once all the aforesaid steps have been run through, a new situation that has produced a new risk has been completely described and the measures for risk reduction have been developed, documented, and validated. The data generated here are stored as a dataset and can then be made available both in the plant safety system PSCC and also in the plant library system SCES on the public library level.

The use of the tools is furthermore likewise stored as a dataset for the methodology to thus continuously improve the availability.

For example, the plant library system is configured to read applicable standards and/or regulations and the plant library system is configured to carry out the automatic and dynamic preparation of the risk evaluation on the basis of the applicable standards and/or regulations.

Figure 8:
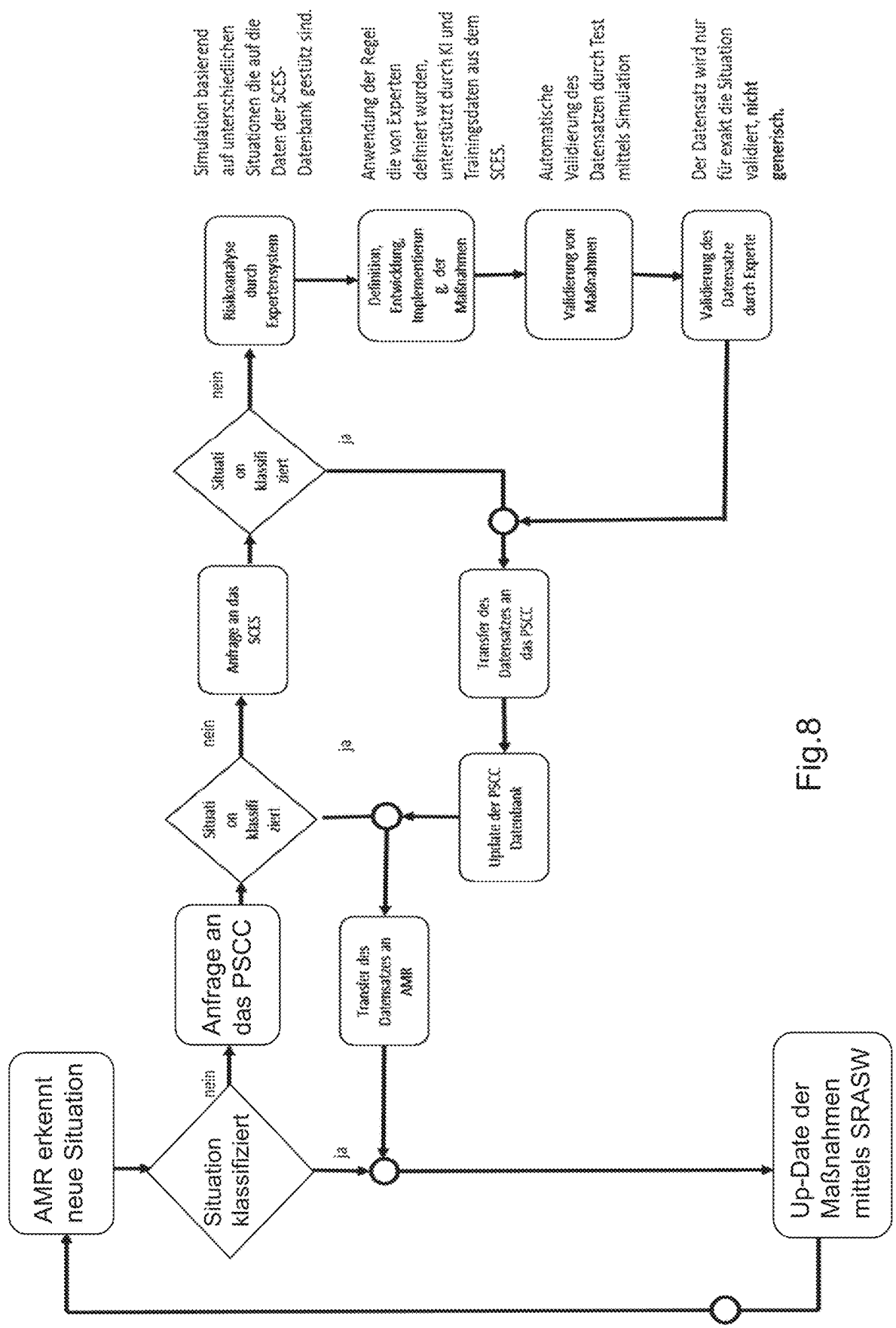
FIG. 8 a risk reduction for unclassified risks by automated expert systems in the plant library system.

FIG. 8 shows a risk reduction for unclassified risks by automated expert systems in the plant library system SCES.

The risk reduction of new, not classified risks is carried out by an automated expert system in accordance with the current normative regulations (for example ISO 12100, ISO 13849, etc.). The following process steps are generally observed:
  Risk analysis
  Design of the measures
  Implementing the measures
  Verifying and validating the measures
  Generating a classified dataset This procedure requires that all the required steps take place in accordance with uniform and software assisted rules and standards. This means that the methods of the risk reduction that human experts use are formed as an algorithm in the automated expert system such that the expert system can use the same performance and methodology as human experts.

The automated expert system can furthermore make use of technological approaches from an artificial intelligence. The proof of risk reduction is then not only based on the data and scenarios present in the plant safety system PSCC, but also on yielding expanded external data.

Risk Analysis:

A situation is analyzed here with respect to the risk of injury to a human. The analysis is made using different features such as the geometry, structure, movement profiles, interaction with other agents, occurrence likelihood, frequency and duration of the exposition, degree of the possible injury, etc.

The use of the automated expert system can already be assisted by the use of simulation in this phase. I.e. the plant library system SCES has a complete digital twin of the plant system and simulates all the possible predictable scenarios at the newly created risk position. The hazard risk at this site then results from the simulation.

Measure Design, Implementation, Verification and Validation:

The process steps of measure design up to the validation are iterative steps that are based very much on simulation and training of algorithms. These steps are run through by the automated expert system for so long until the simulation on the plant library system SCES has as a result the result of a sufficiently great risk reduction. The dataset is then made available on the plant library system SCES, but not tagged as validated.

The implementation for different target systems can already be part of the provided dataset, but is not yet operable without a validation by a person.

Generating a Classified Dataset:

Once all the required aforesaid steps have been run through, a new situation that has produced a new risk has been completely described once for exactly this specific target application and the measures for risk reduction have been developed, and validated.

So that this dataset can be taken up as classified in the plant library system SCES and plant safety system PSCC, it has to be qualified by field testing and multiple validation of an expert group.

The data generated here are stored as a dataset and can then be made available both in the plant safety system PSCC and also in the plant library system SCES at the public library level.

For example, the plant safety system 2 is configured to detect and to check risk reduction measures cyclically or after a determination of a change and is configured to adapt the risk reduction measures cyclically or after determining a change.

Safety Mechanisms in the Detection of the Environment:
  The environment is detected from different perspectives and different sensor technologies.
  Different Perspectives are:
    Sensors 5 at different autonomous mobile robots AMR, movable and stationary machinery, and additionally also sensors 5 or information from infrastructure components.
  Different Sensor Technologies:
    Position detection
    Identification sensors
    Imaging sensors (camera, LIDAR, radar, etc.)
    Radio triangulation.
    Further sensor technologies that are not listed can be used.

Safety Mechanisms in the Preparation of the Digital Twin:
  Different autonomous mobile robots AMR and agents 3 having different hardware platforms and navigation software use the central map. The central map is thus constantly checked.

Safety Mechanisms in the Data Management of the Datasets:
  The datasets in the plant safety system PSCC and in the plant library system SCES are stored on different respectively redundant parts of the plant library system SCES. Known securing methods of IT and OT are used.

Safety Mechanisms in the Communication Between the System Participants:
  Communication generally has to satisfy safety demands in accordance with the objects of the communication. The safety mechanisms can here extend from simple CRCs such as in the securing level of TCP, over safe communication protocols, up to the use of blockchain technologies.

REFERENCE NUMERALS 1 system
2 plant system
3 agents
AMR autonomous mobile vehicles, autonomous mobile robots
5 sensors
PSCC plant safety system
7 first database
SCE plant library system
10 second database
12 interface

The invention claimed is:

1. A system having at least one plant system having at least a plurality of agents, having at least a plurality of autonomous mobile robots, movable machinery, and a plurality of sensors for generating data for use in the safety relevant securing of the plant system,
  wherein a local plant safety system associated with the plant system is present;
  wherein data of the local plant safety system are stored in a first database;
  wherein the local plant safety system has a first data model with data sets of the plant system;

wherein a decentralized public plant library system associated with the local plant safety system is present;
wherein the plant library system is stored in a second database;
wherein the plant library system has at least one second data model having at least data sets for the plant safety system;
wherein the plant safety system and the plant library system are connected to one another via an interface, with data and data sets being transferable between the plant safety system and the plant library system via the interface;
wherein the datasets respectively comprise at least a geometry, a hazard, a safety level, a position, a speed, an identification, and a measure,
wherein the plant safety system is configured to carry out a risk assessment and a risk evaluation for the plant system cyclically or after determining a change and to make decisions on a necessity of a risk reduction cyclically or after determining a change, whereby the plant safety system is configured for an automatic and dynamic preparation of a risk evaluation of the plant system;
wherein the plant library system is configured to read applicable standards and regulations and the plant library system is configured to carry out the automatic and dynamic preparation of the risk evaluation on the basis of the applicable standards and/or regulations,
wherein the autonomous mobile robot is configured to react locally with collision avoidance as part of a risk reduction procedure;
wherein the plant safety system is configured to inform the autonomous mobile robots that are in the environment of the changes of the real situation in comparison with a digital twin of the change;
wherein the plant safety system is configured to check whether the changed situation is an already classified risk;
wherein the autonomous mobile robots are configured to update the corresponding datasets if the risk has already been classified;
wherein the plant safety system is configured to look for a suitable risk and dataset in the public library level on the plant library system if no classified risk and thus no dataset is present on the plant safety system for the new situation;
and wherein the plant library system is configured to take over a new classified dataset that has been created by experts by means of a risk analysis if no correspondingly classified dataset is present on the plant library system.

2. The system in accordance with claim 1, wherein the sensors are arranged at the autonomous mobile robots and at the agents and the sensors generate sensor data for the plant safety system.

3. The system in accordance with claim 1, wherein the plant safety system has a digital map.

4. The system in accordance with claim 1, wherein a position determination of all the agents and autonomous mobile robots takes place.

5. The system in accordance with claim 1, wherein differences between the digital map and the recognized real environmental situation are recognized by the plant safety system.

6. The system in accordance with claim 1, wherein the plant safety system is configured to detect and to check risk reduction measures cyclically or after a determination of a change and is configured to adapt the risk reduction measures cyclically or after determining a change.

7. The system in accordance with claim 1, wherein the plant safety system and the plant library system are each set up as expert systems that are configured to continuously expand the database for new hazards and are configured to generate new datasets.

8. The system in accordance with claim 1, wherein the autonomous mobile robot is configured to react locally with collision avoidance in a first step, wherein the plant safety system is configured to inform the autonomous mobile robots that are in the environment of the changes of the real situation in comparison with a digital twin of the change in a second step; and wherein the plant safety system is configured to check whether the changed situation is an already classified risk in a third step.

9. A system having at least one plant system having at least a plurality of agents, having at least a plurality of autonomous mobile robots, movable machinery, and a plurality of sensors for generating data for use in the safety relevant securing of the plant system,
wherein a local plant safety system associated with the plant system is present;
wherein data of the local plant safety system are stored in a first database;
wherein the local plant safety system has a first data model with data sets of the plant system;
wherein a decentralized public plant library system associated with the local plant safety system is present;
wherein the plant library system is stored in a second database;
wherein the plant library system has at least one second data model having at least data sets for the plant safety system;
wherein the plant safety system and the plant library system are connected to one another via an interface, with data and data sets being transferable between the plant safety system and the plant library system via the interface;
and wherein the plant library system is configured to read applicable standards and/or regulations and the plant library system is configured to carry out the automatic and dynamic preparation of the risk evaluation on the basis of the applicable standards and/or regulations.

10. A system having at least one plant system having at least a plurality of agents, having at least a plurality of autonomous mobile robots, movable machinery, and a plurality of sensors for generating data for use in the safety relevant securing of the plant system,
wherein a local plant safety system associated with the plant system is present;
wherein data of the local plant safety system are stored in a first database;
wherein the local plant safety system has a first data model with data sets of the plant system;
wherein a decentralized public plant library system associated with the local plant safety system is present;
wherein the plant library system is stored in a second database;
wherein the plant library system has at least one second data model having at least data sets for the plant safety system;
wherein the plant safety system and the plant library system are connected to one another via an interface, with data and data sets being transferable between the plant safety system and the plant library system via the interface;

wherein the datasets respectively have at least a geometry, a hazard, a safety level, a position, a speed, an identification, and a measure;

wherein the plant safety system is configured to carry out a risk assessment and a risk evaluation for the plant system cyclically or after determining a change and to make decisions on a necessity of a risk reduction cyclically or after determining a change, whereby the plant safety system is configured for an automatic and dynamic preparation of a risk evaluation of the plant system;

wherein the plant safety system has a digital map;

wherein differences between the digital map and the recognized real environmental situation are recognized by the plant safety system;

and wherein the plant library system is configured to read applicable standards and/or regulations and the plant library system is configured to carry out the automatic and dynamic preparation of the risk evaluation on the basis of the applicable standards and/or regulations.

11. The system in accordance with claim 10, wherein the sensors are arranged at the autonomous mobile robots and at the agents and the sensors generate sensor data for the plant safety system.

12. The system in accordance with claim 10, wherein a position determination of all the agents and autonomous mobile robots takes place.

13. The system in accordance with claim 10, wherein the plant safety system is configured to detect and to check risk reduction measures cyclically or after a determination of a change and is configured to adapt the risk reduction measures cyclically or after determining a change.

14. The system in accordance with claim 9, wherein the plant safety system and the plant library system are each set up as expert systems that are configured to continuously expand the database for new hazards and are configured to generate new datasets.

* * * * *